(12) United States Patent
Kamath et al.

(10) Patent No.: US 10,277,535 B2
(45) Date of Patent: Apr. 30, 2019

(54) NETWORK SWITCH SYSTEMS INCLUDING LOGICAL SWITCHES

(71) Applicant: HEWLETT PACKARD ENTERPRISE DEVELOPMENT LP, Houston, TX (US)

(72) Inventors: Harish B Kamath, Bengalooru (IN); Vijay vishwanath Hegde, Bangalore (IN); Michael Lee Witkowski, Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 85 days.

(21) Appl. No.: 15/475,356

(22) Filed: Mar. 31, 2017

(65) Prior Publication Data
US 2018/0287966 A1   Oct. 4, 2018

(51) Int. Cl.
G06F 9/455   (2018.01)
H04L 12/46   (2006.01)
H04L 12/931  (2013.01)
H04L 12/715  (2013.01)

(52) U.S. Cl.
CPC .......... H04L 49/70 (2013.01); G06F 9/45558 (2013.01); H04L 12/4641 (2013.01); H04L 45/64 (2013.01); G06F 2009/45562 (2013.01); G06F 2009/45595 (2013.01)

(58) Field of Classification Search
CPC ..... H04L 49/70; H04L 49/357; H04L 49/356; H04L 12/4641
See application file for complete search history.

(56) References Cited

U.S. PATENT DOCUMENTS

| 8,831,013 | B2 | 9/2014 | Gnanasekaran et al. | |
| 9,369,426 | B2 | 6/2016 | Koponen et al. | |
| 9,497,039 | B2 | 11/2016 | Greenberg et al. | |
| 9,990,228 | B1* | 6/2018 | Jayanthi | G06F 9/4856 |
| 2008/0155676 | A1 | 6/2008 | Johnson et al. | |
| 2011/0299534 | A1* | 12/2011 | Koganti | H04L 12/4625 370/392 |
| 2013/0294453 | A1* | 11/2013 | Han | H04L 45/66 370/401 |
| 2014/0362859 | A1 | 12/2014 | Addanki et al. | |
| 2015/0074793 | A1* | 3/2015 | Dalvi | H04L 63/0272 726/15 |

(Continued)

FOREIGN PATENT DOCUMENTS

WO   WO-2016155816 A1   10/2016

OTHER PUBLICATIONS

Cisco Unveils New Data Center Innovations to Accelerate Hybrid Cloud Deployments, (Research Paper), Jan. 3, 2016, 5 Pgs.

(Continued)

*Primary Examiner* — Charles C Jiang
*Assistant Examiner* — Ryan C Kavleski
(74) *Attorney, Agent, or Firm* — Hewlett Packard Enterprise Patent Department

(57) ABSTRACT

An example system in accordance with an aspect of the present disclosure includes a logical switch and a controller to dynamically instantiate the logical switch including a control plane isolated from other logical switches of the network switch system. The logical switch includes a protocol stack independent of and isolated from other logical switches of the network switch system.

17 Claims, 5 Drawing Sheets

(56) References Cited

U.S. PATENT DOCUMENTS

| | | | |
|---|---|---|---|
| 2015/0312118 A1* | 10/2015 | Behera | H04L 45/26 |
| | | | 370/241 |
| 2017/0048130 A1* | 2/2017 | Goliya | H04L 45/54 |
| 2017/0126436 A1* | 5/2017 | Du | H04L 12/66 |
| 2017/0149931 A1* | 5/2017 | Lochhead | H04L 67/327 |
| 2018/0191679 A1* | 7/2018 | Mulka | H04L 45/38 |

OTHER PUBLICATIONS

Infrastructure-base Reference Architecture, (Research Paper), May 29, 2012, 29 Pgs.

Amaral, M., et al.; "Performance Evaluation of Microservices Architectures Using Containers"; 2015 IEEE 14th International Symposium on Network Computing and Applications, IEEE, Sep. 28, 2015, pp. 27-34. XP032846262, DOI; 10.1109/NCA.2015.49 [retrieved on Jan. 4, 2016].

Makam, S.; "Opensvwitch and ovsdb Sreenivas Makam's Blog?"; Jan. 2, 2014, pp. 1-9.

Truyen, E., et al.; "Towards a container-based architecture for multi-tenant SaaS applications"; Adaptive and Reflective Middleware, ACM, Dec. 12, 2016, pp. 1-6, XP058307897. DOI: 10.1145/3008167.3008173, ISBN: 978-1-4503-4662-7.

* cited by examiner

NETWORK SWITCH SYSTEMS INCLUDING LOGICAL SWITCHES

BACKGROUND

Different types of network devices may be used in different applications. For instance, in data centers certain network devices, like switches, may be used in large numbers. Depending on the network environment, different switches may be useful to provide different capabilities and/or to target different aspects of the data center network, such as edge connectivity, aggregation, core, and so on. In some environments a solution may involve many different types of switches, which involve time and effort to configure and set up.

BRIEF DESCRIPTION OF THE DRAWINGS/FIGURES

DETAILED DESCRIPTION

Figure 1:
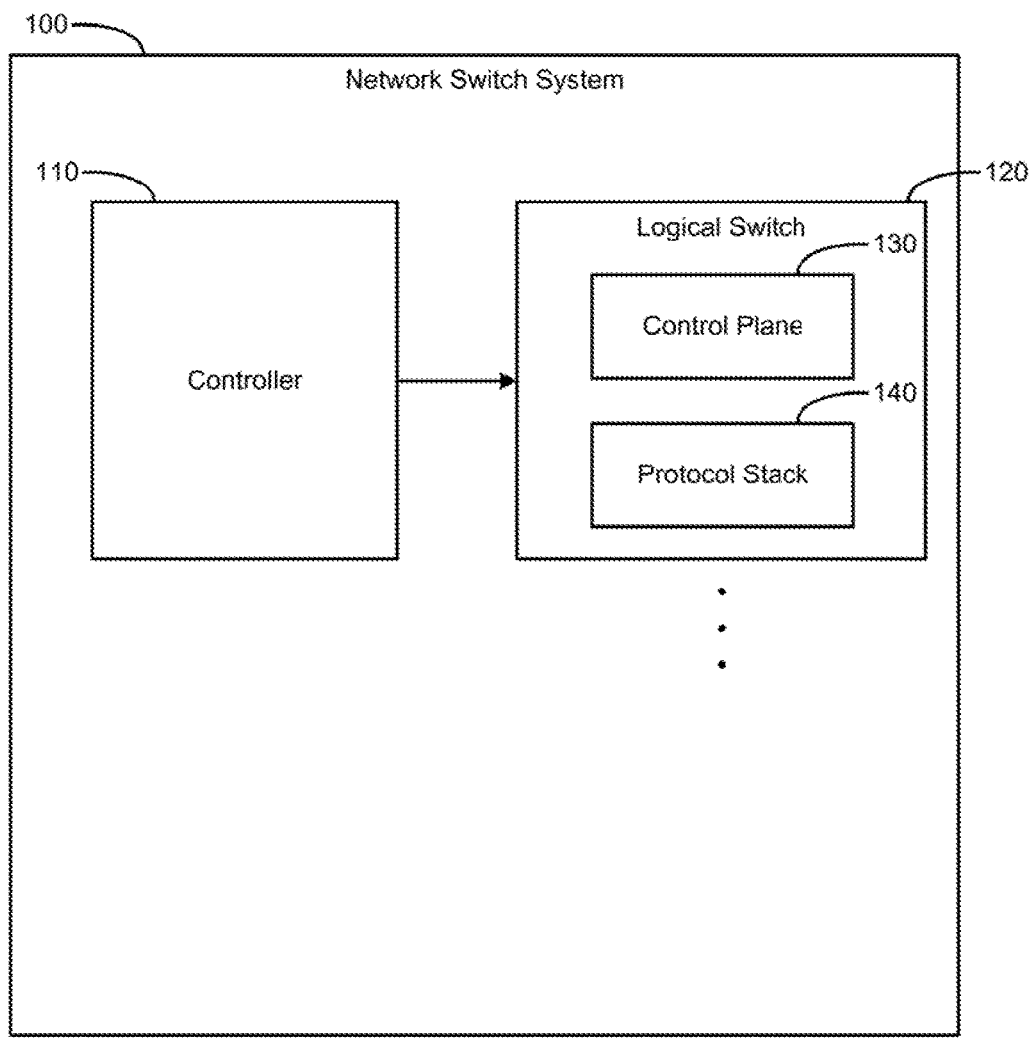
FIG. 1 is a block diagram of an example network switch system including a controller.

A switch can be operated based on a network operating system (NOS), and switch hardware platforms can include a control plane controller (e.g., a microprocessor) capable of serving large numbers of configurations in a data center. A NOS can enable a network switch system to serve as a standalone modular system having switch resources of a common namespace, to manage switch hardware resources. Operations, limits, and functionalities of such switches can be defined when the NOS is installed on the switch, e.g., by flashing a NOS firmware image at the time of manufacture.

A network switch hardware platform may be programmed via the NOS to operate using one of multiple alternative software architectures (or functional sets). These software architectures are loaded on the hardware platform via a corresponding one of several different software images. Thus, a single software image type is programmed onto the switch before being delivered to a user as one of several different product types. Because the switch configuration (type) is precast and delivered to the user, the switch carries a single personality such as a classic top-of-rack switch (TOR), a virtual connect interconnect module, an Open-Switch, a software-defined networking (SDN)-enabled switch with OpenFlow, and the like.

Switch software architecture can also support a generic boot loader for loading one of several different types of software images after the platform has been delivered to the user. However, precasting a single switch configuration and/or supporting a generic boot loader to load a single configuration fail to allow multiple switch software stacks or images to operate on a switch hardware platform simultaneously and may have limited functionality. Such approaches are unable to create multiple logical switches on a network switch system (e.g., on the switch hardware platform) simultaneously. For the continuously changing needs of data-center infrastructures, a precast switch device (with associated single personality) may not fulfill the needs of a dynamic environment in which cost-sensitivity and other such factors play a role. In some instances, it may be useful to be re-purpose network switches for different usage models and/or workloads.

Example implementations described herein may improve the ability of a switch to meet dynamic service needs. In some examples, features provide isolation of resources for each dynamically-loaded network service and assign an appropriate number of resource limits to a given service.

In an example implementation, a network switch system can provide composable switches on-demand using a container-based approach. This allows on-demand profiles for a switch. Switch hardware can be utilized in an optimized manner, by configuring multiple virtual switches of a given type or different types, even on an "as-needed" basis. Large-scale data centers can be served by example network switch systems utilizing partitioning of switching hardware into multiple logical switches, realizing true multi-tenant solutions for a given infrastructure. Example switch hardware platforms can achieve capabilities similar to those provided by servers, storage, and the like, achieving dynamically-provisioned software capabilities on a given hardware platform without a need for multiple separate, specific hardware solutions. Example implementations may satisfy application-specific needs for switch hardware resources, in a more light-weight manner compared to using hypervisors or virtualization, and may dynamically instantiate multiple, unrelated network services simultaneously, with proper isolation between services on a given network switch system.

FIG. 1 is a block diagram of a network switch system 100 including a controller 110 according to an example. A controller, as used herein, may refer to a component of a network switch system that interfaces with and/or manages the operation of or connection to one or multiple other components within the network switch system.

Controller 110 dynamically instantiates at least one logical switch 120, for instance as a containerized switch stack, to meet dynamic service needs. In the examples herein, a logical switch refers to a set of ports on a distributed switch having a unique identifier to overlay a layer-2 (L2) network. A given logical switch 120 includes a control plane 130 isolated from other logical switches of the network switch system 100, to logically isolate and partition the given logical switch 120 at an application level. The given logical switch 120 also includes a protocol stack 140 of at least one protocol, independent of and isolated from other logical switches of the network switch system 100.

The network switch system 100 may include a composition of three planes: control plane, data plane, and management plane. The behavior in each of these planes can be addressed when operating in a partitioned environment. In an example implementation, control plane services can be partitioned, and data traffic can be treated in a segregated manner. In addition, the example network switch systems can support multiple external management plane entities interacting with the containerized services that they manage, without interfering with each other. Thus, the control plane and data plane resources of the given logical switch 120 are isolated from other logical switches, and management plane resources can support interactions with at least one external management plane entity.

In some examples, network switch system 100 may include a plurality of logical switches 120. Accordingly, network switch system 100 is not limited to a single control plane operating system and/or software stack within which control structures for logical switches must be maintained. Rather, each logical switch 120 of network switch system 100 may contain its own control plane 130 and protocol stack 140, independent of other logical switches 120. By instantiating isolated logical switches 120, example implementations of the network switch system 100 may, for example minimize risk of a fatal flaw in one protocol that might affect the entire control plane and/or multiple logical switches 120.

Isolation and separation between logical switches 120 can be achieved using various techniques. In an example implementation, containerization is used to containerize a logical switch 120 on top of a Linux operating system. Such implementations may provide more robust reliability because a fatal flaw in a given virtual switch would be isolated and prevented from affecting other logical switches 120 of the network switch system 100. Thus, example implementations may enable true control plane isolation.

Network switch system 100 may include an operating system that includes a logical switch manager to manage any number of logical switch control plane application sets to be run on the network switch system 100. For example, the network switch system 100 can use a boot loading mechanism to allow multiple different operating environments to be loaded on the network switch system 100, one of the operating environments being a Linux operating system having container support to allow various switch control plane software (logical switches 120) to be loaded into the environment and run simultaneously. Thus, example implementations of the network switch system 100 can be based on operating systems that direct controller 110 to operate as a logical switch manager to manage the container lifecycle of any number of logical switch 120 control plane application sets to be run on the network switch system 100.

Additionally, example implementations offer increased flexibility regarding management options. For example, a single physical network switch system 100 may incorporate different management modules for implementing different switch protocol stacks 140, without needing to use multiple different physical switches. In an example implementation, a single physical network switch system 100 may provide one of the logical switches 120 (e.g., a containerized switch stack) to serve as an Ethernet switch, while on that same network switch system 100, a programmable dev-op software-defined stack can also be provided, thereby enabling multiple different programming and/or management models on the same physical switch system hardware (i.e., a single-switch infrastructure).

By providing composable infrastructure, example implementations of network switch system 100 enable the composing of a switch in a physical device that can have a given desired network "flavor." The example network switch system contains a framework in which needed software/services can be contained. Over time, different network "personalities" can be added to network switch system 100, allowing the personality of the switch to be composed dynamically. In an example implementation, a NOS image can be installed onto the bare metal hardware of network switch system 100, and then workflow can be deployed on network switch system 100 via containers as needed over time. Example implementations can be based on the open compute project (OCP) open switch architecture, e.g., using the open network initialization environment (ONIE) as a generic boot/firmware loader to load a base Linux OS supporting containerization, extended by allowing dynamic loading of upper layer components of each container (e.g., logical switch 120) independently.

Different container deployment models can be leveraged to load independent container/logical switches. Accordingly, example implementations are not limited to a single monolithic image being loaded on a physical switch at one time. Rather, example implementations can load up a framework on the network switch system 100 to, in turn, load different personalities on the switch hardware, simultaneously.

In an example implementation, a physical switch (network switch system 100) can be partitioned into parts (e.g., containers), each representing a logical switch 120. The number of containers supported by network switch system 100 is arbitrary, and the personality of a given container can depend on the kind of logical switch created for that container. Thus, a single example implementation can satisfy multiple network needs simultaneously, e.g., by creating multiple isolated parts in a physical device to serve as multiple logical switches 120. The logical switches 120 may include, for example, a standard top-of-rack (TOR) logical component that can behave much like a physical OpenSwitch-based switch; a virtual connect (VC) profiled switch to behave as an OpenSwitch carrying a virtual connect profile on its logical device resources; a fiber channel/fibre channel over Ethernet (FC/FCoE) gateway to present capabilities for storage-area network (SAN) connectivity; a software-defined networking (SDN) switch to behave similar to a merchant device, where network flows are defined by the SDN controller based on OpenFlow; sampled flow (sFlow) and L3-L7 services, to perform services to clients and/or controllers subscribed by the logical switch; and so on. In such a configuration, various features can be provided, such as: dividing a physical device into multiple logical switches 120 while providing necessary software isolation; isolation of logical switch resources (e.g., separation of flows, ports, etc.); enabling services on respective logical switches 120 (e.g., virtual connect, OpenFlow, etc.); and providing minimum and maximum limits on resources per logical switch 120.

These example features provide various advantages, such as the ability to dynamically compose a switch with specific capabilities matched to infrastructure needs, providing an approach for DevOps solutions. Example implementations may allow for a network infrastructure to be more easily created and scaled to match changing needs. A network solution for a given application (e.g., a datacenter) can be composed to include different capabilities as needed, while being based on the use of a consistent hardware setup. A logical switch can be dedicated per-tenant, e.g., in a multi-tenant environment. The customizable and isolated characteristics provide valuable infrastructure for particular applications, such as in a production and test environment. Example implementations also enable the ability to run a collection of switches in a chassis-based infrastructure.

Figure 2:
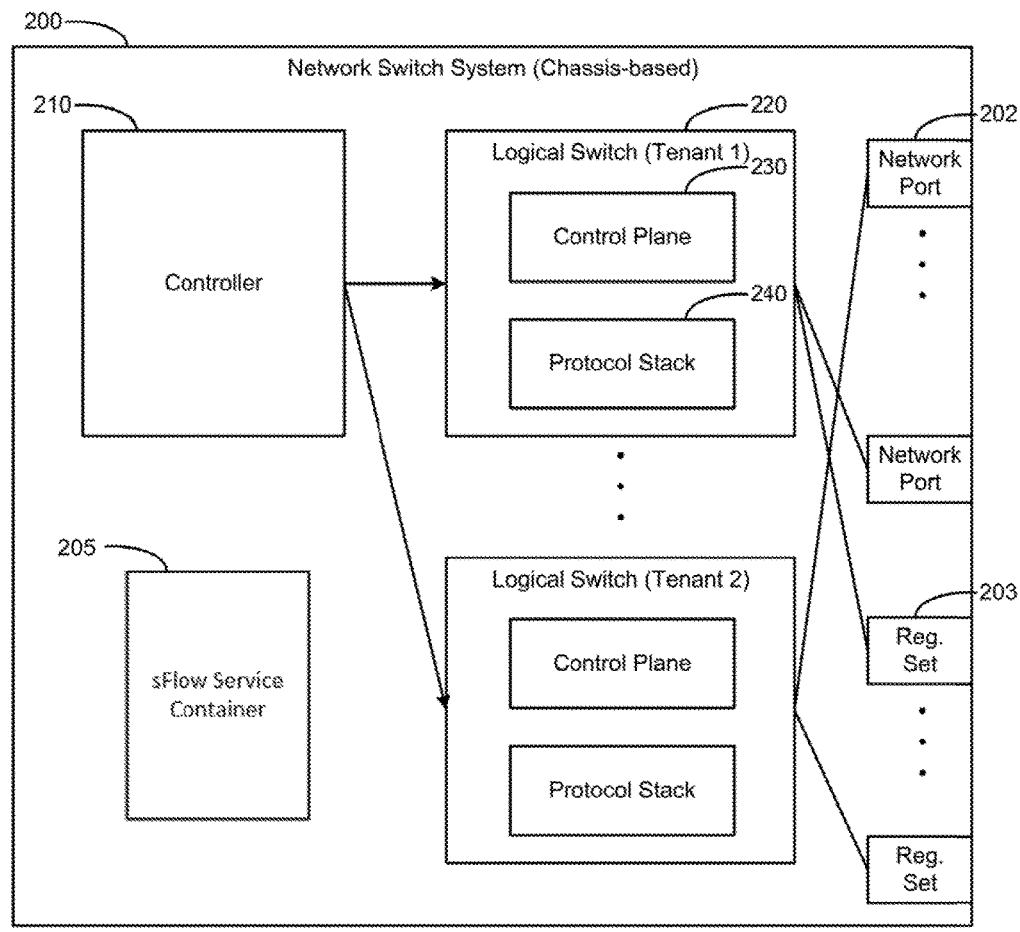
FIG. 2 is a block diagram of an example network switch system including a controller.

FIG. 2 is a block diagram of a network switch system 200 including a controller 210 according to an example. The network switch system 200 is chassis-based. A plurality of logical switches 220 may be provided, for instance, on a per-tenant basis. A given logical switch 220 can be dynamically instantiated by the controller 210. Thus, the logical switches 220 can be provided as a plurality of containerized switch stacks to meet dynamic service needs, e.g., a given logical switch 220 can include a control plane and a protocol stack 240 of at least one protocol, isolated from other logical switches 220 of the network switch system 200. A given logical switch 220 is logically isolated and partitioned at an application level.

The controller 210 can run the plurality of logical switches 220 in a chassis-based infrastructure, to provide at least one logical switch 220 per tenant in a multi-tenant environment. Example implementations provide a composable architecture, to add or remove different personalities to the network switch system 200 dynamically over time.

Providing isolated logical switches 220 (e.g., using containerization) enables the network switch system 200 to define different profiles to each of the containers/logical switches 220, which can be segmented. For example, the network switch system 200 can include a dedicated container/logical switch 220 for firewall services, a dedicated container/logical switch 220 for load balancing, a dedicated container/logical switch 220 to collect network statistics/provide services, and so on. The network switch system 200 can include different classes of containers to satisfy varying deployment needs in a given scenario. The network switch system 200 is composable by a user/customer, and provides a common platform that can be set up to run as different types of devices as needed by different types of situations/customers, without a need to provide multiple different hardware devices (SDN, traditional switch, firewall services, security management, protocol analysis, and so on).

The network switch system 200 can include a plurality of network ports 202 common across the hardware of the network switch system 200. The network ports 202 can be associated with one or more logical switches 220. For example, a subset of the network ports 202 can be assigned to a given container/logical switch 220. The assigned network port(s) 202 is/are thereby isolated from other logical switches 220, e.g., by binding the assigned network port(s) 202 to the corresponding logical switch(es) 220 to provide traffic containment within the bounds of the given logical switch(es) 220.

The switch hardware of the network switch system 200 also can include at least one control plane register set 203. A control plane register set 203 can be assigned to a corresponding container/logical switch 220 to enable the control plane 230 of the given logical switch 220 to make use of the control plane register set 203.

In an example implementation that includes assigning services to multiple containers/logical switches 220, a sampled flow (sFlow) service container 205 can interact with management plane resources by performing sFlow management operations across multiple logical switches 220 of the network switch system 200. Accordingly, packets flowing through the network switch system 200 (e.g., through those logical switches 220 assigned to sFlow services) can be randomly sampled by sFlow service container 205, and header and statistics data for the port(s) that the packet(s) arrived on can be forwarded for collection/analysis.

Network switch system 200 can achieve sFlow analysis and services without needing to set up a third-party appliance to provide sFlow-related services. For instance, sFlow service container 205 can locally perform switch collection functionality, and locally process and forward the collected and synthesized data. Thus, diagnostic and network monitoring capabilities can be provided locally (e.g., by given containers/logical switch(es) 220). Furthermore, these capabilities can be freely provided, without needing to allocate to given network ports 202. Rather, example implementations can provide such capabilities independent of the network ports 202, e.g., can be allocated according to a given stream of sampled data that may be targeted at a given container/logical switch 220. Accordingly, the network switch system 200 supports the creation of containers/logical switches 220 that are not assigned a network port(s), but rather provide features/services (e.g., network monitoring and analysis) that can be housed on the network switch system 200. For example, sFlow service container 205 can use such services to report sFlow data on a sub-agent basis of data per logical switch 220, and/or to report sFlow data on the basis of the entire device, e.g., data per physical network switch system 200.

Controller 210 aids in the creation of logical switches 220 and can be initialized to load the logical switches 220. In an example implementation, a flow of instructions can be used to realize multiple logical switches 220 in the physical network switch system 200. For example, the open network initialization environment (ONIE) boot loader can be used to dynamically load upper layer components of each containerized logical switch 220 independently, thereby supporting different personalities of the networking switch system 200. Such flow of instructions can be implemented to bring up a container/logical switch 220, to define what are the logical switches 220 in a given hardware implementation, or the logical components in a given hardware implementation. Such instructions can be implemented, e.g., as part of a configuration script or configuration that is readable as part of a startup process for the network switch system 200.

In an example implementation, a flow of instructions to set up the network switch system 200 can include: 1) prepare default Container 0 by initializing a common set of services such as Open vSwitch Database (OVSDB) management protocol services; 2) acquire a list of containers to be configured; 3) identify a list of internal networks to be created per container; 4) prepare switch buffer resources per port/switch wide; and 5) for each container in the container list: a) establish logical switch references in OVSDB; b) obtain container profile information from OVSDB; c) establish logical switch identities; d) apply port protection attributes for each port in the port list; e) establish an internal network(s) for the container f) enable switch services based on container profile description; g) enforce switch-specific configurations by obtaining details from OVSDB (e.g., forwarding table limits, translation table size, etc.); and h) optionally establish relationship(s) with other container(s).

Figure 3:
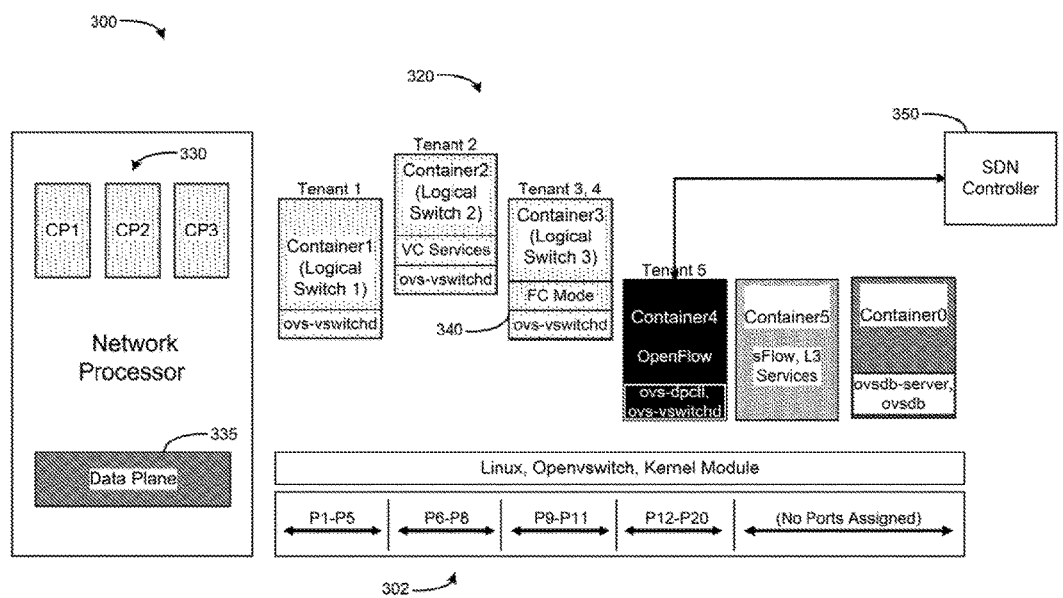
FIG. 3 is a block diagram of an example network switch system including a plurality of containers.

FIG. 3 is a block diagram of a network switch system 300 including a plurality of containers 320 (e.g., logical switches) according to an example. Network ports 302 and their assignments to the containers 320 are illustrated, along with the control plane 330 and data plane 335 of a network processor.

In examples described herein, a network processor may be a single device or distributed across multiple devices. As used herein, a processor may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

A given container 320 can include a protocol stack 340 and may exchange communications with an external entity, such as an SDN controller 350. As shown, containers 1-4 are associated with corresponding network ports P1-P20. Containers 5 and 0 are not associated with network ports.

The various containers 320 can be associated with distinct characteristics, which may be associated to the containers 320 independent of each other. For example, container 4 is carrying the personality of an end-host software-defined networking (ESDN) switch. In contrast, container 5 is an sFlow service container and performs management operations related to sFlow operations (e.g., sFlow, firewall settings, etc.) at a logical switch level and a network switch system level. The layer-2 (L2) network addresses for containers 1, 2, and 3 are learned locally, whereas container 4 information is populated from an external source (SDN controller 350), which also can be a network service from a centralized source that gets pushed out to this network switch system 300. Accordingly, container 4 illustrates behavior of how switching and other rules can be applied onto a logical switch 320, while still being part of the same hardware of the network switch system 300.

Containers 5 and 0 illustrate examples that do not need to be assigned switch hardware (i.e., network ports). Thus, containerization of logical switches 320 does not necessarily mean that hardware resources of the network switch system 300 are allocated to the corresponding container 320. Because the network switch system 300 supports containerization for an optimized environment, such services can be provided on, and be co-resident on, the network switch system 300, and therefore such services do not need to be deployed on some other platform. Furthermore, the network switch system 300 enables such services to be isolated from each other, to minimize the impact of any errors or failures that may affect a given service, by being isolated from other services on the network switch system 300. Thus, services are not forced to sit together at a global application layer of the network switch system 300. Furthermore, network connections can be created between different containers 320 in the network switch system 300, e.g., purely using Linux process connections without a need for physical network ports 302. Thus, protocols in a given container (e.g., container 4) can communicate with the protocols of another container (e.g., container 5) to handle processes that are kept separate by the containers. Accordingly, the containers 320 support isolated communications between services of the containers 320, while remaining isolated to prevent protocol failures from affecting each other.

Some containers 320 include, among their protocol stacks 340, a switch daemon (ovs-vswitchd). The switch daemon can be shared as multiple copies for different partitions/containers 320 in the hardware of the network switch system 300. Thus, multiple copies of the switch daemon can be run in different containers, to provide robust isolation for applications in different containers 320.

As described above, a logical switch can include a composition of three planes; control plane, data plane, and management plane. The network switch system 300 can address the behavior in each of these planes operating in a partitioned environment. Thus, control plane services are partitioned, and data traffic is treated in a segregated manner. Furthermore, multiple external management plane entities (e.g., such as SDN controller 350) are supported interacting with the containerized services they manage, without interfering with each other.

Control Plane Operations can include various features to support partitioned environments for the containers/logical switches 320. In an example implementation, the Open-Switch NOS can be compartmentalized using the container technology of Linux upon which OpenSwitch NOS is built. Containers enable isolation of the processes/domains executed within each container. Processes such as Virtual Connect (VC) Services, OpenFlow, and the like may be limited to the container level. Such processes can be used to address the control plane needs of the switch.

Link Aggregation Group (LAG), quality of service (QoS), virtual local area networks (VLANs), flows, and the like are example resources that can be categorized under control plane operations. Such resources can be created/deleted/updated as a result of user actions (e.g., customization) and/or as a result of internal logic of switching components (e.g., flows).

Processes (i.e., services) that assist in managing such resources can be scoped to the containers/logical switches 320. For example, a resource, when created, can carry ownership of the container (logical switch) 320 or data when queried to the OVSDB. Accordingly, data will be relevant and targeted for the container-specific (logical switch-specific) operations.

In an example implementation, link aggregation (LAG-1) in logical switch 1, and LAG-1 in logical switch-2 of the network switch system 300, will be implemented as two different LAGs because of the isolation between containers/logical switches 320, despite their use of the same label/designation LAG-1. Similarly, a VLAN-160 of logical switch 1, and a VLAN-160 of logical switch 2, are uniquely identifiable within the network switch system 300 (despite having the same label/designation), and may use VLAN translation mechanisms. A spanning tree protocol (STP) may be realized on a per-container basis, e.g., using STP over VLAN. The control plane service of a container (e.g., ovs-vswitchd) may interact with local hardware, such as by introducing a user-defined QoS onto a port, or by interacting with a remote service provider such as the SDN controller 350, and so on.

At run-time, a control plane module of a logical switch 320 can make use of control plane registers (e.g., register sets 203 shown in FIG. 2) of the network switch system 300. Hardware of the network switch system 300 can include control plane register sets, and a set can correspond to a logical switch 320. However, a logical switch 320 (e.g., container 4 SDN profiled) that obtains definitions externally (e.g., from the SDN controller 350), may not include a control plane register set. Control plane configurations may vary with each logical switch 320, such as enabling VC-specific behavior, media access control (MAC) table capacity definitions for TOR type switches, and so on.

The control planes 330 are shown as CP1, CP2, and CP3 in FIG. 3 but can vary depending on implementation, depending on their association with control processor register sets, can include one or more in a given hardware network switch system 300, and can be associated with a given container 320 for operating reasons. Control processor register sets can be used by the control plane processor to manipulate operations of the network switch system 300. Example implementations of the network switch system 300 described herein can take advantage of multiple and/or redundant control register copies using the containerized architecture, e.g., through the Linux kernel module stack or open vswitch stack, to expose copies of the hardware to e.g., multiple different containers to improve performance.

In addition to providing such control plane features, example implementations described herein can provide segregation of data traffic in the data plane. The network switch system 300 can provide data plane services operating at the physical device level (e.g., services that can be shared by multiple and/or all of the logical switches 320 of the physical network switch system 300), while allowing the control plane services to operate in isolation. Although the data plane can take a shared services model, the isolated control plane services enables network traffic to be contained within the bounds of a given logical switch 320. In other words, network ports 302 assigned to a given logical switch 320 can be bound to the logical switch level.

As an example illustration of traffic isolation, consider a network frame received on port P1 of logical switch 1, destined to port P6 of logical switch 2. The switching subsystem can be prevented from violating the isolation rules, e.g., based on the creation of an internal Virtual LAN (VLAN) or Private Virtual LAN (PVLAN) for a given logical switch 320.

To illustrate VLAN/PVLAN behavior, network ports 302 can be grouped per logical switch 320. For example, network ports P1-P5 may be assigned to Container 1, network ports P6-P8 may be assigned to Container 2, and so on. As shown, the network ports 302 are assigned to ("owned by") respective containers 320 and traffic on those network ports 302 is not visible beyond the corresponding container 320 to which the network ports 302 are assigned.

In an example implementation, network switch system 300 can recognize traffic on a given network port group 302 belonging to a VLAN or PVLAN corresponding to a logical switch 320, and thus achieve traffic isolation. The network switch system 300 can treat internal VLANs as being unique instances in a given physical network switch system 300. In another example implementation of switch behavior, a logical switch (e.g., container4) may be implemented as an SDN device. The SDN device can acquire its switching data table from the SDN Controller 350, e.g., using OpenFlow services. For example, MAC table entries corresponding to the logical switch can be updated as a result of OpenFlow services.

Management Plane Operations are also supported by example network switch systems 300. In a given scenario, a network switch system 300 can be used to deploy containers 320 providing sFlow or L3-L7 services. In such cases, services can be delivered by a container 320 without the container owning a physical port(s). As an example, an sFlow service container can function at the device level, i.e., across the physical device of the network switch system 300. Accordingly, information associated with sFlow (e.g., sampled statistics and port-level statistics) can be made accessible by a device-wide sFlow engine. The sFlow data reporting may be based on a per-logical switch level (a sub-agent concept of sFlow may be adopted). Alternatively, device-level statistics may be reported. Accordingly, the illustrated Container 5 can be instantiated with a containerized switch stack as an sFlow service container that does not include switch hardware resources allocated to the container, and is to perform management operations of the controller. Container 5 can also serve as a software-defined networking (SDN) switch, profiled based on obtaining definitions, switching data table, and media access control (MAC) table entries from an external SDN controller.

Figure 4:
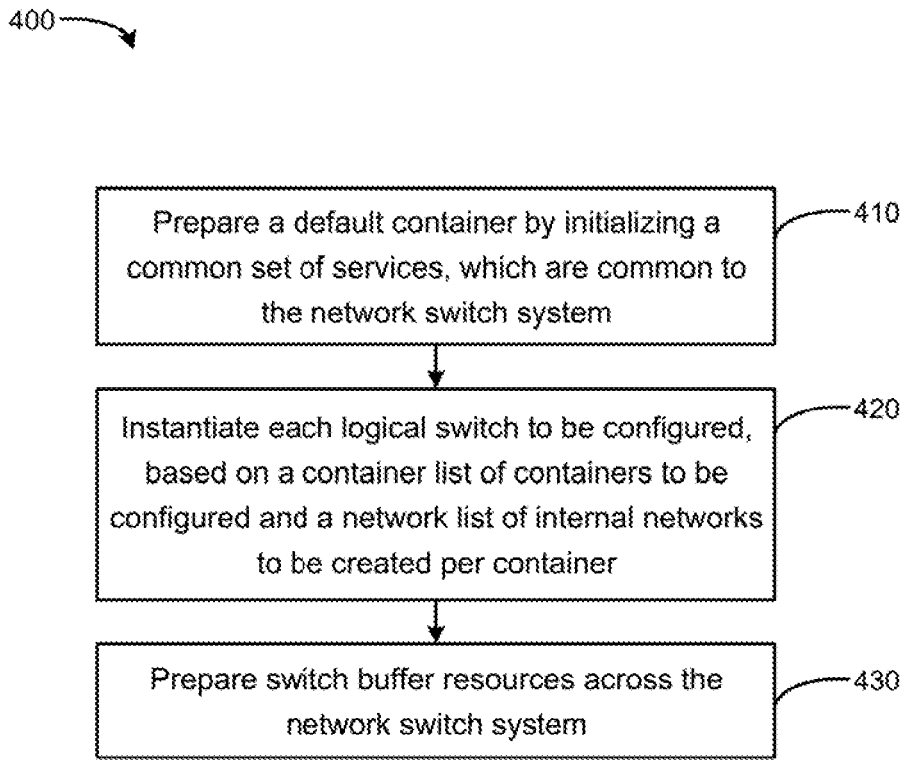
FIG. 4 is an example flow chart based on instantiating logical switches.
Figure 5:
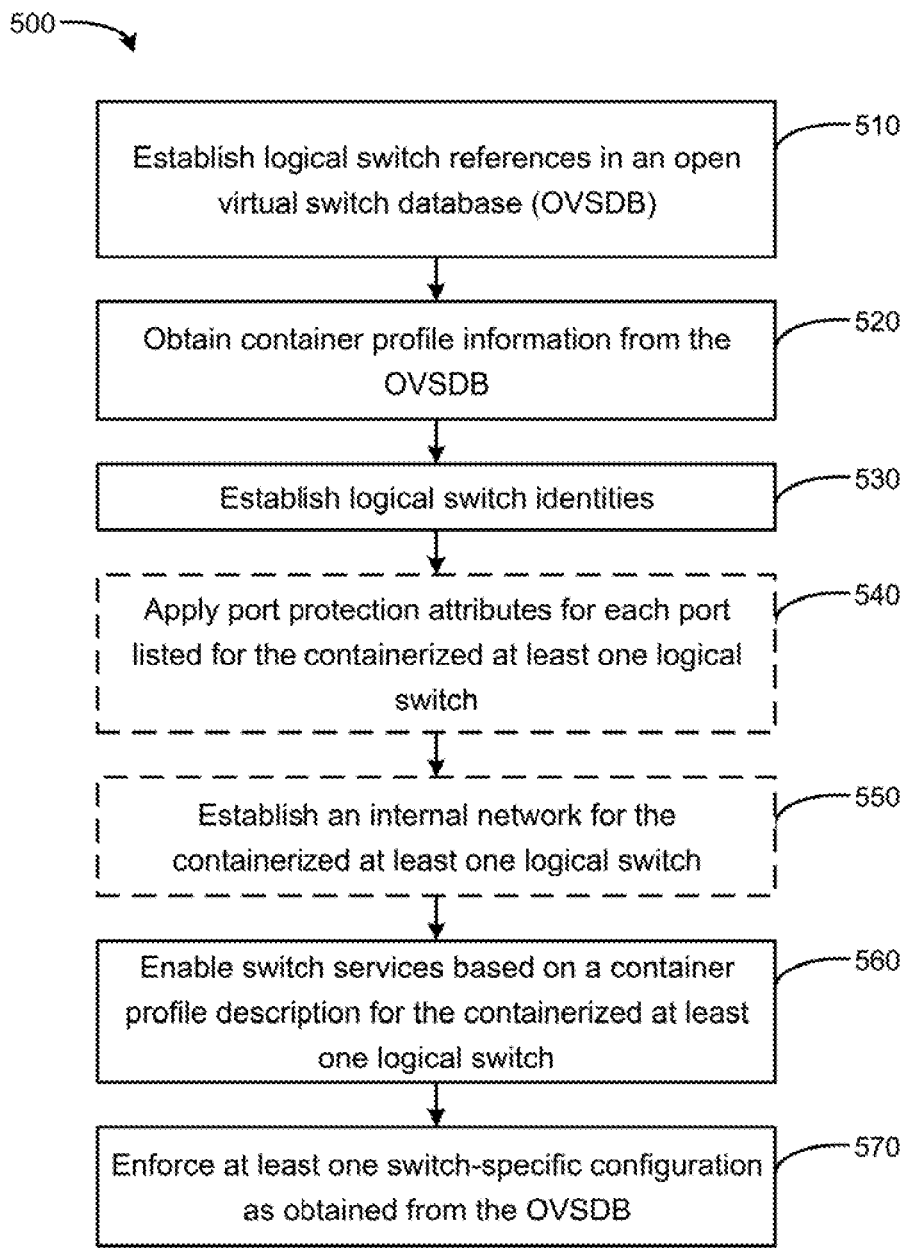
FIG. 5 is an example flow chart based on setting up containers.

Referring to FIGS. 4 and 5, flow diagrams are illustrated in accordance with various examples of the present disclosure. The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 4 is a flow chart 400 based on instantiating logical switches according to an example. In block 410, a default container is prepared by initializing a common set of services, which are common to the network switch system. For example, a controller of the network switch system can initialize the Open vSwitch Database (OVSDB) management protocol services for the network switch system, by preparing a default Container 0 that is to use those services. In block 420, the controller is to instantiate each logical switch based on a container list of containers to be configured, and a network list of internal networks to be created per container. For example, the controller can refer to a configuration file(s) during boot up of the network switch system, to obtain the list of logical switches and/or internal networks. The configuration file(s) can be customized by a user, and can be preinstalled during manufacture. In block 430, switch buffer resources are prepared per port, across the network switch system. For example, the controller can establish buffer resources for a given logical switch to use, based on which physical network ports are available in the network switch system.

FIG. 5 is a flow chart 500 based on setting up containers according to an example. Blocks 510-570 may be performed for a given containerized logical switch that is to be instantiated in a network switch system. In block 510, logical switch references are established in an open virtual switch database (OVSDB). For example, a controller of the network switch system can create in the OVSDB a list of virtual/logical source and destination ports for the logical switches that are to be instantiated. In block 520, container profile information is obtained from the OVSDB. For example, the controller can obtain from the OVSDB information relating to what types of resources are to be included in the profile of a container to be instantiated.

In block 530, logical switch identities are established. For example, a logical switch can be established with a top-of-rack (TOR) identity, for use by applications that are to interact with the logical switch. In block 540, port protection attributes are optionally applied for each port listed for the containerized logical switch. For example, the controller can set a quota for received and/or transmitted network traffic for a given port, where relevant (e.g., for those logical switches that happen to be assigned physical ports).

In block 550, an internal network is optionally established for the containerized at least one logical switch. For example, the controller can set up a network connection between different containers, as appropriate, using Linux process connections. In block 560, switch services are enabled based on a container profile description for the containerized logical switch. For example, the controller can maintain a file including container profile descriptions, and refer to the file when associating a given service with a given logical switch. In block 570, a switch-specific configuration is enforced, as obtained from the OVSDB. For example, the controller can enforce configurations for logical switches based on a set of rules, such as to enforce segregation of data traffic between logical switches.

Example implementations provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., including a controller and/or processor of a computing device) can include and/or receive a tangible non-transitory computer-readable medium storing a set of computer-readable instructions (e.g., software, firmware, etc.) to execute the methods described above and below in the claims. For example, a system can execute instructions to direct a controller engine to instantiate a logical switch, wherein the engine(s) include any combination of hardware and software to execute the instructions described herein. As used herein, a processor may include one or a plurality of processors such as in a parallel processing system. Memory may include memory addressable by the processor for execution of computer readable instructions. A computer readable medium may include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. A network switch system comprising:
   a controller; and
   a plurality of logical switches dynamically instantiated by the controller as a plurality of containerized switch stacks to meet dynamic service needs, wherein a given logical switch includes a control plane and a protocol stack isolated from other logical switches of the network switch system to logically isolate and partition the given logical switch at an application level;
   wherein the controller is to run the plurality of logical switches in a chassis-based infrastructure to provide a logical switch per tenant in a multi-tenant environment, and wherein the controller is to provide a composable architecture to add or remove different personalities dynamically over time.

2. The network switch system of claim 1, further comprising a plurality of network ports, wherein the controller is to assign a network port to the given logical switch such that the assigned network port is isolated from other logical switches, and wherein the assigned network port is bound to the logical switch to provide traffic containment within the logical switch.

3. The network switch system of claim 1, wherein the controller is based on container technology of a Linux-based OpenSwitch network operating system (NOS), to isolate processes and domains executed within a containerized switch stack.

4. The network switch system of claim 1, wherein the given logical switch includes a composition of control plane, data plane, and management plane resources, wherein the control plane and data plane resources of the logical switch are isolated from other logical switches, and wherein the management plane resources are to support interactions with an external management plane entity.

5. The network switch system of claim 4, further comprising:
   a sampled flow (sFLow) service container to perform sFlow operations across a plurality of logical switches of the network switch system.

6. The network switch system of claim 5, wherein the sFlow service container is to report sFlow data based on at least one of i) a sub-agent basis of data per logical switch, and ii) a device basis of data per physical network switch system.

7. The network sfwitch system of claim 1, wherein the controller is to create internal Virtual LAN (VLAN) or Private Virtual LAN (PVLAN) connections for the logical switch, to provide traffic isolation and prevent violation of isolation rules for the given logical switch.

8. The network switch system of claim 1, further comprising a connection, based on a Linux process connection, between containerized logical switches, to enable protocol communication between containerized logical switches.

9. The network switch system of claim 1, wherein the given logical switch is instantiated as at least one of: i) a top of rack (TOR) switch to behave as a physical OpenSwitch-based switch; ii) a virtual connect (VC) profiled switch to behave as an OpenSwitch carrying virtual connect profiles on its logical device resources; iii) a Fiber Channel/Fiber Channel over Ethernet (FC/FCoE) gateway to present capabilities for storage-area network (SAN) connectivity; and iv) a software-defined networking (SDN) switch wherein network flows are defined by an SDN controller based on OpenFlow.

10. The network switch system of claim 9, wherein the given logical switch is instantiated as the SDN switch, and is profiled based on obtaining definitions, switching data table, and media access control (MAC) table entries from an external SDN controller.

11. The network switch system of claim 1, wherein the controller is initialized based on an open network initialization environment (ONIE) boot loader mechanism to dynamically load an operating system for the network switch system to support containerized logical switches and implementation of a logical switch manager by the controller to manage container lifecycles.

12. The network switch system of claim 1, wherein switch hardware of the network switch system includes a control plane register set, wherein a given control plane register set corresponds to the given logical switch to enable the control plane of the given logical switch to make use of the control plane register set.

13. The network switch system of claim 1, wherein the plurality of logical switches are to support interactions between their containerized services and external management plane entities, while remaining isolated from each other.

14. The network switch system of claim 1, wherein data plane services of the network switch system operate at a physical device level and are shared by the plurality of logical switches.

15. The network switch system of claim 1, further comprising an Open vSwitch Daemon accessible by a corresponding one of the plurality of logical switches.

16. The network switch system of claim 1, wherein different ones of the plurality of logical switches are instantiated dynamically at different points over time to provide a composable personality of the network switch system.

17. A method of instantiating a logical switch of a network switch system, comprising:
   preparing a default container by initializing a common set of services, which are common to the network switch system;
   instantiating each logical switch to be configured, based on a container list of containers to be configured and a network list of internal networks to be created per container; and
   preparing switch buffer resources across the network switch system,
   for each containerized logical switch to be instantiated:
   establishing logical switch references in an open virtual switch database (OVSDB);
   obtaining container profile information from the OVSDB;
   establishing logical switch identities;
   applying port protection attributes for each port listed for the containerized logical switch;
   establishing an internal network for the containerized logical switch;
   enabling switch services based on a container profile description for the containerized logical switch; and
   enforcing a switch-specific configuration as obtained from the OVSDB.

* * * * *